US008340089B2

(12) United States Patent
Jang

(10) Patent No.: US 8,340,089 B2
(45) Date of Patent: Dec. 25, 2012

(54) APPARATUS AND METHOD FOR MANAGING DATA TRANSFER IN VOIP GATEWAY

(75) Inventor: Yun-Seok Jang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1896 days.

(21) Appl. No.: 11/475,872

(22) Filed: Jun. 28, 2006

(65) Prior Publication Data

US 2007/0019631 A1    Jan. 25, 2007

(30) Foreign Application Priority Data

Jul. 21, 2005    (KR) ........................ 10-2005-0066456

(51) Int. Cl.
| | |
|---|---|
| H04L 12/56 | (2006.01) |
| H04L 12/28 | (2006.01) |
| H04M 15/00 | (2006.01) |
| G06F 21/00 | (2006.01) |
| G06F 15/177 | (2006.01) |
| G05F 15/16 | (2006.01) |

(52) U.S. Cl. ... 370/389; 370/392; 370/401; 379/355.05; 726/3; 709/222; 709/228

(58) Field of Classification Search .......... 370/352–356, 370/389, 392, 395.2, 395.3, 395.31, 395.54, 370/397–398, 401; 709/206, 222, 228, 230–236, 709/245–246; 455/554.1, 555; 379/280, 379/262, 350–355.1; 710/3–4; 726/3

See application file for complete search history.

(56) References Cited

U.S. PATENT DOCUMENTS

| | | | | |
|---|---|---|---|---|
| 6,674,745 | B1 * | 1/2004 | Schuster et al. | 370/352 |
| 7,301,952 | B2 * | 11/2007 | Furukawa et al. | 370/400 |
| 7,417,978 | B1 * | 8/2008 | Chou et al. | 370/352 |
| 7,447,804 | B2 * | 11/2008 | Koo | 709/249 |
| 7,643,479 | B2 * | 1/2010 | Fujiwara et al. | 370/389 |
| 7,684,317 | B2 * | 3/2010 | March et al. | 370/229 |
| 7,826,602 | B1 * | 11/2010 | Hunyady et al. | 379/93.09 |
| 2002/0114322 | A1 * | 8/2002 | Xu et al. | 370/352 |

(Continued)

FOREIGN PATENT DOCUMENTS

KR    10-2003-0072927    9/2003

(Continued)

OTHER PUBLICATIONS

Korean Office action for Korean Patent Application No. 10-2005-0066456 issued on Aug. 28, 2006.

*Primary Examiner* — Melanie Jagannathan
*Assistant Examiner* — Wutchung Chu
(74) *Attorney, Agent, or Firm* — H.C. Park & Associates, PLC

(57) ABSTRACT

A Voice over Internet Protocol (VoIP) gateway is provided which upon an extension call between VoIP terminals, optimizes transfer routes of data between the terminals. In setting a session for the extension call, the VoIP gateway converts IP addresses and ports of the originator's and recipient's terminals included in an invite message for session connection transmitted from one terminal of an internal private network of the VoIP gateway into internal IP addresses and internal ports to enable media data of the originator's and recipient's terminals to be directly transmitted without by way of a wide area network (WAN) module and a media server of the VoIP gateway, thereby effectively managing resources of the network system.

15 Claims, 9 Drawing Sheets

U.S. PATENT DOCUMENTS

| | | | |
|---|---|---|---|
| 2002/0141384 A1* | 10/2002 | Liu et al. | 370/352 |
| 2002/0150083 A1* | 10/2002 | Fangman et al. | 370/352 |
| 2003/0018814 A1* | 1/2003 | Kao et al. | 709/245 |
| 2003/0219011 A1* | 11/2003 | Han | 370/352 |
| 2003/0220102 A1* | 11/2003 | Kallio | 455/422.1 |
| 2004/0024879 A1* | 2/2004 | Dingman et al. | 709/227 |
| 2004/0252683 A1* | 12/2004 | Kennedy et al. | 370/389 |
| 2005/0053222 A1* | 3/2005 | Lee et al. | 379/219 |
| 2005/0076108 A1* | 4/2005 | Li et al. | 709/223 |
| 2005/0201304 A1* | 9/2005 | Olshansky | 370/282 |
| 2006/0013211 A1* | 1/2006 | Deerman et al. | 370/389 |
| 2006/0155864 A1* | 7/2006 | Izumi | 709/230 |
| 2006/0159065 A1* | 7/2006 | Jennings | 370/352 |
| 2006/0187912 A1* | 8/2006 | Schwartz et al. | 370/389 |
| 2007/0195807 A1* | 8/2007 | Collins et al. | 370/401 |
| 2008/0165765 A1* | 7/2008 | Neuhaus | 370/352 |
| 2009/0059818 A1* | 3/2009 | Pickett | 370/259 |
| 2011/0128914 A1* | 6/2011 | Furukawa et al. | 370/328 |

FOREIGN PATENT DOCUMENTS

KR  10-2004-0085549  10/2004

* cited by examiner

APPARATUS AND METHOD FOR MANAGING DATA TRANSFER IN VOIP GATEWAY

CLAIM OF PRIORITY

This application makes reference to, incorporates the same herein, and claims all benefits accruing under 35 U.S.C. §119 from an application for APPARATUS AND METHOD FOR MANAGING DATA TRANSFER IN VOIP GATEWAY earlier filed in the Korean Intellectual Property Office on 21 Jul., 2005 and there duly assigned Ser. No. 10-2005-0066456.

BACKGROUND OF THE INVENTION

1. Field of the Invention

The present invention relates to an apparatus and method for managing data transfer in a voice over Internet protocol (VoIP).

2. Description of the Related Art

First, a session initiation protocol (SIP) and an H.323, a representative protocol for a voice over Internet protocol (VoIP) technology and a VoIP call, will now be described.

VoIP means a series of communication service technologies which convert voice data into data packets of an Internet protocol to enable a voice call like a telephone call in a general telephone network (e.g., a public switched telephone network (PSTN)).

The SIP is a control protocol of application layer that creates, modifies and releases an end to end multimedia session. Herein, the multimedia session includes an Internet telephone call. Such SIP is nothing but a protocol setting a session. VoIP system uses a session description protocol (SDP) to clarify a method for end to end data transfer. Such SDP includes a title and a purpose of session, a media description to be used for session, and information required for media transport (address, port, format, etc.).

H.323 describes a method for construction of VoIP system using various protocols of Internet Telecommunication Union (ITU). Such H.323 defines a process such as signaling conversion, media transport, call set-up, etc. For example, for performance of the call set-up, H.225.0 is used, and for voice and image media transport, real-time protocol (RTP)/RTP control protocol (RTCP) is used.

SUMMARY OF THE INVENTION

It is, therefore, an object of the present invention to provide an apparatus and method for managing data transfer in a voice over Internet protocol (VoIP) gateway, which upon an internal call of VoIP terminals, compares an admitted IP address of a recipient's terminal included in a message with an admitted IP address of a network address translation (NAT) server to which an originator's terminal belongs, and as a result, converts addresses and port information of the originator's and recipient's terminals included in the message into an internal IP address and an internal port number of the respective terminals.

To achieve the above and other objects, according to an aspect of the present invention, there is provided a VoIP gateway comprising: an address comparison module for comparing an admitted IP address of a recipient's terminal included in a message transmitted from a terminal of an internal network of the gateway with an admitted IP address of the gateway; an address conversion module for, as a comparison result, converting the addresses and port information of the originator's and recipient's terminals included in the message into internal IP addresses and internal port numbers of the originator's and recipient's terminals; and a forwarding module for forwarding the message to a local area network (LAN) module if the admitted IP address of the recipient's terminal included in the message and the admitted IP address of the VoIP gateway are same each other.

In accordance with an embodiment of the invention, there is provided a network address translation (NAT) server comprising: an address comparison module for comparing an admitted IP address of a recipient's terminal included in a message transmitted from a terminal of an internal network of the NAT server with an admitted IP address of the NAT server; an address conversion module for, as a comparison result, converting the addresses and port information of the originator's and recipient's terminals included in the message into internal IP addresses and internal port numbers of the originator's and recipient's terminals; and a forwarding module for forwarding the message to a local area network (LAN) module if the admitted IP address of the recipient's terminal included in the message and the admitted IP address of the NAT server are same each other.

Preferably, the VoIP gateway and the NAT server may further comprise a port forwarding table including a user datagram protocol (UDP) port number, an internal IP address, and an internal port or a private conversion port with respect to the internal terminal.

Preferably, the VoIP gateway or the NAT server may be an apparatus supporting a session initiation protocol (SIP), an H.323 protocol, and a Megaco (media gateway control)protocol.

Preferably, the message transmitted from the terminal of the internal network may be an invite message for session connection or a response message for session connection.

In accordance with another aspect of the present invention, there is provided a method of data transfer for a voice over Internet protocol (VoIP) call, the method comprising the steps of: comparing an admitted IP address of a recipient's terminal included in an invite message for session connection transmitted from an originator's terminal with an admitted IP address of a VoIP gateway; if the admitted IP addresses of the recipient's terminal and the VoIP gateway are same each other, converting the IP addresses and port information of the originator's and recipient's terminals included in the invite message into internal IP addresses and internal port information of the originator's and recipient's terminals to transfer the converted invite message for session connection to the recipient's terminal; and transferring a response message for session connection including the internal IP address and port information of the originator's terminal to the originator's terminal.

Preferably, the comparison step may include a step of checking whether or not there is an internal terminal having a same private conversion port as the port of the recipient's terminal included in the invite message for session connection.

Preferably, the method of data transfer of the present invention may further comprise a step of after setting of a session through the procedure, transferring, by the originator's or recipient's terminal, media data to the internal IP address of the recipient's or originator's terminal.

Preferably, the method of data transfer of the present invention may further comprise a step of, in case that the VoIP gateway operates as a basic router, or that the originator's and recipient's terminals use different sub-networks, checking a destination address included in media data received in the VoIP gateway to transfer the media data to a destination terminal.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

Figure 1:
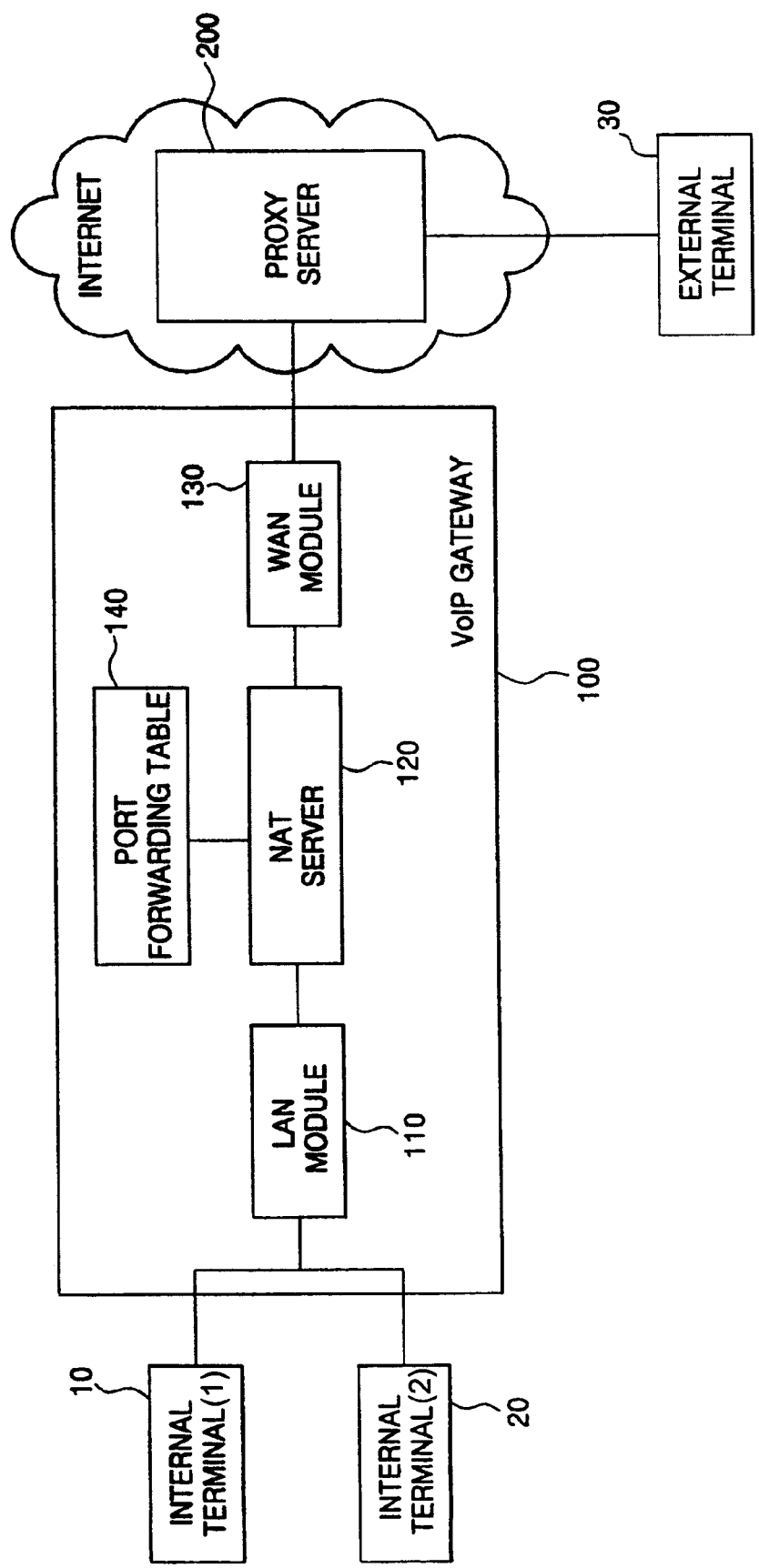
FIG. 1 is a diagram illustrating a voice over Internet protocol (VoIP) service network including a VoIP gateway.

FIG. 1 is a diagram illustrating a VoIP service network including a VoIP gateway. A procedure of main wire and extension calls in a VoIP service network and a problem thereof will be seen referring to FIG. 1.

A VoIP service network may be configured to include a VoIP gateway 100 connected to VoIP internal terminals (1 and 2) 10 and 20 and to a VoIP external terminal 30 via a proxy server 200 (Internet). The VoIP gateway having a local area network (LAN) module 110, a network address translation (NAT) server 120 and a wide area network (WAN) module 130 and a port forwarding table 140.

A procedure of calling between the internal terminal (1) 10 and the external terminal 30 using the VoIP gateway system as configured above will be now described.

First, the internal terminal (1) 10 transmits an invite message for session connection to the LAN module 110 of the VoIP gateway 100. The LAN module 110 of the VoIP gateway 100 receives the invite message and transmits it to the NAT server 120. The NAT server 120 converts information on address and port of the internal terminal (1) 10 included in the invite message into an admitted IP address and a private conversion port of the VoIP gateway 100, referring to port forwarding table 140. The NAT server 120 transports the invite message for session connection of the internal terminal (1) 10 to the proxy server 200 via the WAN module 130. The proxy server 200 receives the invite message from the VoIP gateway 100 and transports it to the external terminal 30 via an external network. The external terminal 30 and the internal terminal (1) 10 set a session based on information of the invite message for session connection. When a session is set through this procedure, in order for media data to transport from the internal terminal (1) 10 to external terminal 30, media data are transported via all modules in the VoIP gateway 100.

In the above VoIP system, a procedure of an extension call is also conducted like the procedure of main wire call. Hereinafter, the procedure of the extension call will be seen.

The procedure for transport of the invite message for session connection from the internal terminal (1) 10 to the WAN module 130 has been already described. The WAN module 130 checks the admitted IP address of the recipient's terminal included in the invite message for session connection transported from the internal terminal (1) 10 and determines a destination of the invite message received. The destination of the invite message received is an admitted IP address of the VoIP gateway 100 to which an internal terminal (2) 20 belongs. The WAN module 130 of the VoIP gateway 100 perceives the recipient's terminal referring to the internal conversion port number of the invite message and transports the invite message for session connection to the internal terminal (2) 20 via the LAN module 110. The internal terminal (2) 20 transports a response message for session connection to the internal terminal (1) 10 in reverse order to the procedure described above.

Figure 2:
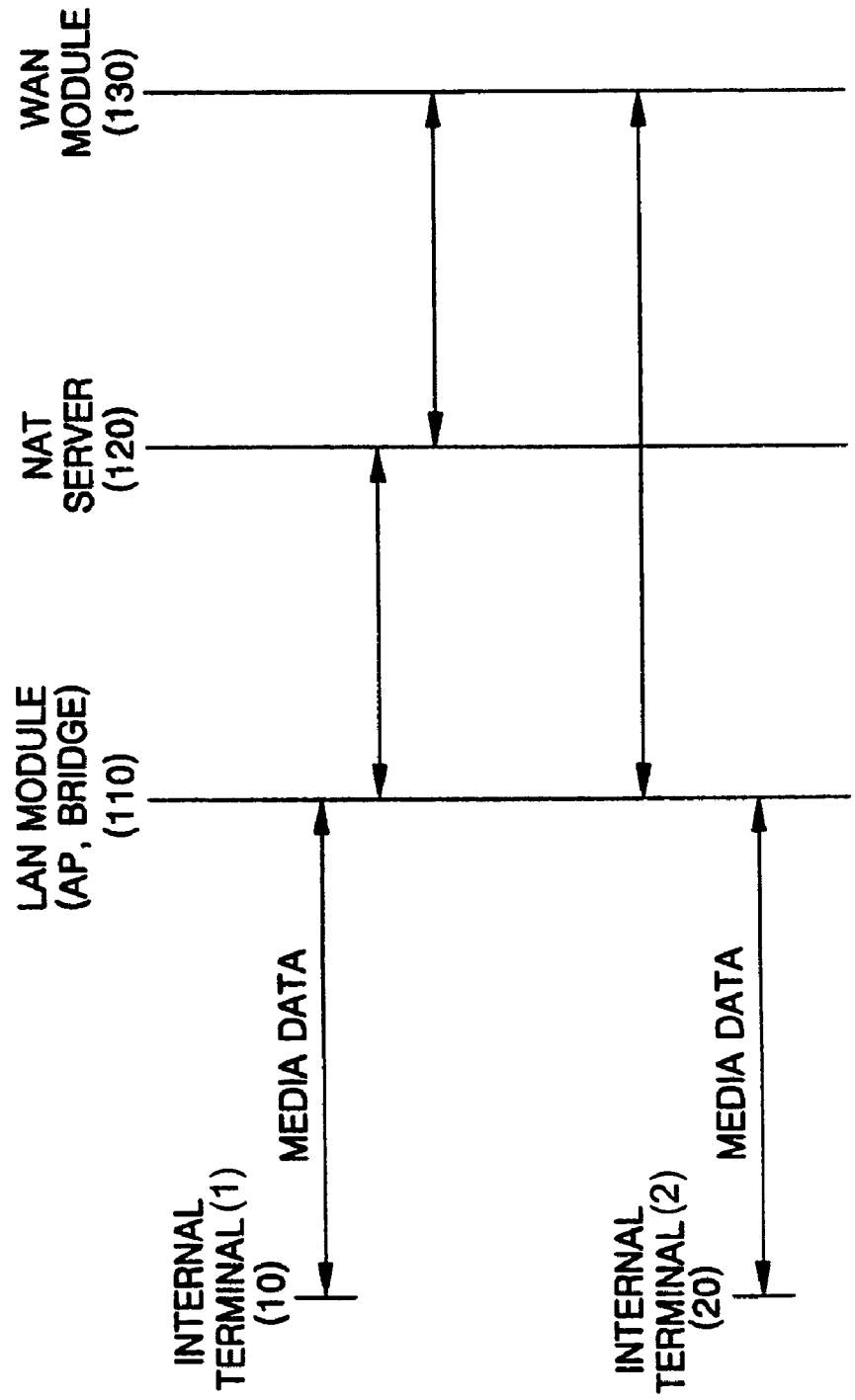
FIG. 2 is a diagram illustrating transfer routes of media data upon a VoIP call.

FIG. 2 is a diagram illustrating transport routes of media data upon extension VoIP calling.

Media data are exchanged using addresses of originator's and recipient's terminals included in the invite message and the response message for session connection. As illustrated in FIG. 2, media data in the VoIP system using the NAT server 120 are transported via the NAT server 120. Upon the internal calling through the procedure, also in the case of the internal calling of the terminals belonging to the same network, media data should be transported via the respective modules of the NAT server 120. Herein, in order to determine a transport route of media data through checking a destination of media data, either routing in a private network or transporting via an external network, an IP address of network layer should be checked. The internal module of NAT server 120 for communication with the external network is an apparatus for communication with the external network, but it also processes media data for extension calling, causing a problem of consumption in whole resources of NAT.

Hereinafter, an apparatus for managing data transfer in a voice over Internet protocol (VoIP) gateway according to the present invention and its operation will be described in detail with reference to the accompanied drawings in which preferred embodiments of the invention are illustrated. In referring to respective components in the drawings with reference symbols, like reference symbols indicate the same or similar components. In describing the present invention, if considered that the details on the related known function or construction may unnecessarily render the scope of the present invention ambiguous, the detailed description thereof will be omitted.

Figure 3:
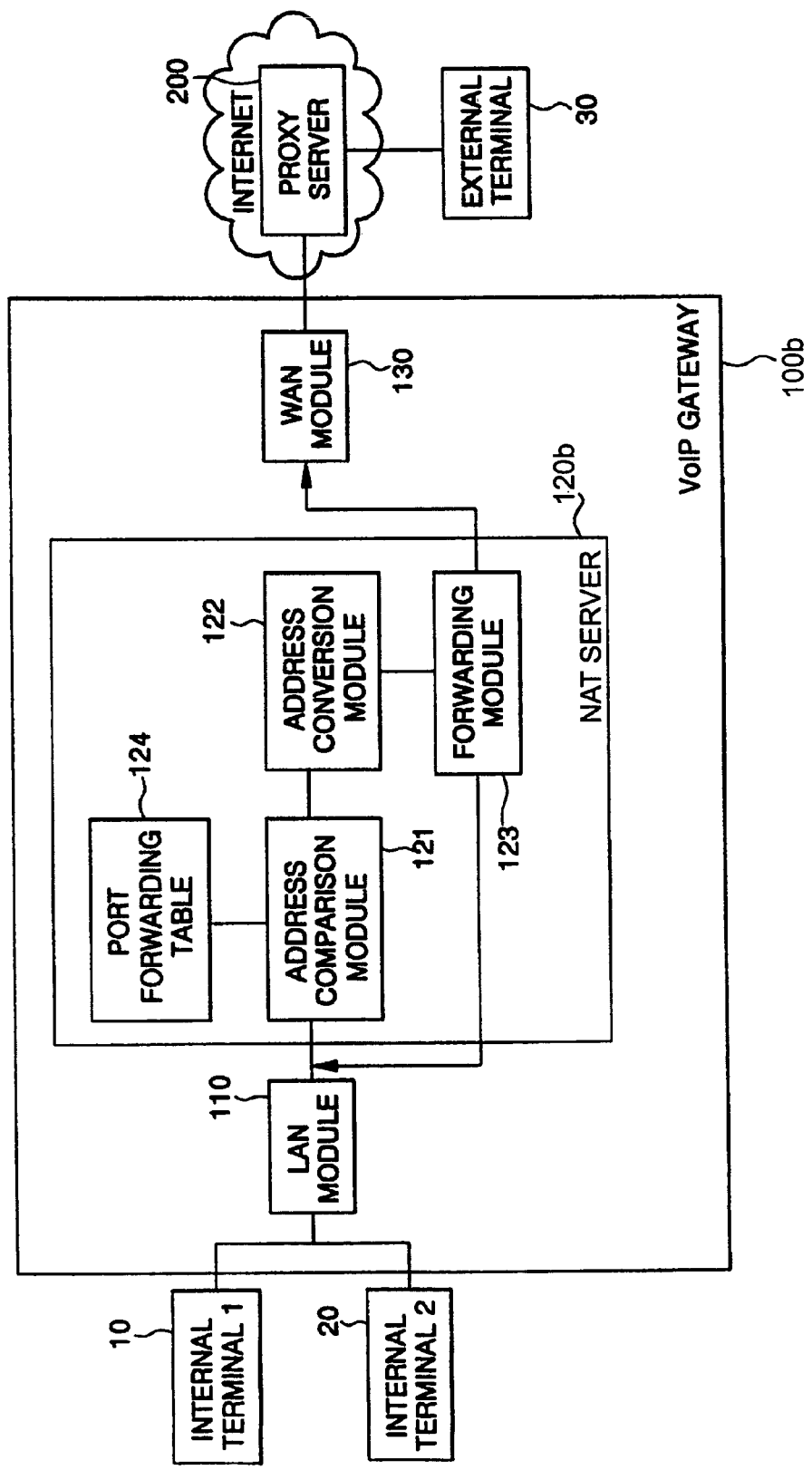
FIG. 3 is a diagram illustrating a VoIP service network using a VoIP gateway according to a first embodiment of the present invention.

FIG. 3 is a diagram illustrating a VoIP system configured using a VoIP gateway optimally controlling data transfer routes according to a first embodiment of the present invention.

As illustrated in FIG. 3, the VoIP system to which the present invention is adapted includes internal terminals (1 and 2) 10 and 20, a VoIP gateway 100b, a proxy server 200 and a VoIP external terminal 30. The VoIP gateway 100b includes a local area network (LAN) module 110, a network address translation (NAT) server 120b and a wide area network (WAN) module 130.

The internal terminals 10 and 20 are elements that users use for making a VoIP call. The users can request setting a session for another terminal using the internal terminals 10 or 20, and admit the request for setting a session of the other terminal. After setting a session, the internal terminals 10 or 20 convert a sound signal into an electric signal to enable the user to make a voice call.

The internal terminals 10 and 20 are connected with the VoIP gateway 100b to transmit and receive an invite message for session connection, a response message for session connection or a control signal.

The VoIP gateway 100b is an element for relaying an invite message for session connection, a response message for session connection and media data between a circuit switching network and a packet switching network.

The LAN module 110 allocates IP addresses to the respective terminals using a dynamic host configuration protocol (DHCP) to function as an access point with respect to a wireless terminal and as a bridge with respect to a cable terminal. The LAN module 110 checks an address of a destination terminal included in transmitted data to transfer it to a terminal of an internal network or the NAT server.

In case that a message for external call is transported from the internal terminals 10 or 20, the NAT server 120b converts an internal IP address and a port of a terminal included in the message into an admitted IP address and a private conversion port. In addition, the NAT server 120b receives a message for internal call, compares an IP address of a recipient's terminal with an IP address of the NAT server 120b, and converts and forwards IP addresses of originator's and recipient's terminals included in the message. At this time, the message may be an invite message for session connection or a response message for session connection which is used for VoIP call in the course of setting a session.

The NAT server 120b may be configured so that it is included in the VoIP gateway 100b, or otherwise it is provided as an independent constitutional element. FIG. 3 illustrates a system in which the NAT server 120b is included in VoIP gateway 100b.

The NAT server 120b of the VoIP gateway 100b according to the present invention may include an address comparison module 121, an address conversion module 122, a forwarding module 123 and a port forwarding table 124.

The address comparison module 121 compares an admitted IP address of a recipient's terminal included in a message transmitted from the internal terminals 10 and 20 with an admitted IP address of the NAT server 120b. During the procedure for setting a session, the address comparison module 121 compares an admitted IP address of the recipient's terminal with an admitted IP address of the NAT server 120b included in an invite message for session connection.

Herein, as for the case that the addresses are same, there is a case that the recipient's terminal is a body of the VoIP gateway 100b. To exclude a case that a body of the VoIP gateway 100b is a recipient's terminal, the address comparison module 121 may further include a port comparison module (not shown) for retrieving the port forwarding table 124 to determine whether there is an internal terminal having a same port number as a port number of a recipient's terminal included in an invite message for session connection.

The address conversion module 122 converts the addresses and port information of the originator's and recipient's terminals included in the message into internal IP addresses and port information of the respective terminals according to the comparison result in the address comparison module 121. The address conversion module 122 is a device for changing the addresses and port information of the originator's and recipient's terminals included in the invite message for session connection into an internal IP address and an internal port number of the respective terminals in the course of setting a session.

The forwarding module 123 forwards the message to the LAN module 110 or WAN module 130 according to the comparison result in the address comparison module 121. In the course of setting a session for internal call, the forwarding module 123 forwards the invite message for session connection to the LAN module 110. However, even though the forwarding module 123 does not exist, only the invite message for session connection is transported via the WAN module 130 and the proxy server 200, and after a session is once set, media data can be directly transmitted and received using the internal IP address and port.

The port forwarding table 124 stores a private UDP (user datagram protocol) port number, an internal IP address, an internal port, a private conversion port, etc. for various terminals provided in the NAT internal network.

The WAN module 130 determines to which terminal, in the internal network, data is transferred when data is received from the terminal exterior to the private network during an external call.

The proxy server 200 is a constitutional element for managing locations and calls of an external VoIP terminal and a VoIP terminal in the NAT. In particular, as for a management for user's location information, there may be a function of registration, modification and deletion of user's present location. Also, as for a function of call management, there are a function of set-up, cancellation and termination of call with the other party, and a function of admission or denial of call requested from the other party.

The proxy server 200 of the present invention is connected with the WAN module 130 of the VoIP gateway 100b, receives an invite message for session connection, a response message for session connection, a control signal, etc. from the VoIP gateway 100b, and transmits it to a destination.

Figure 4:
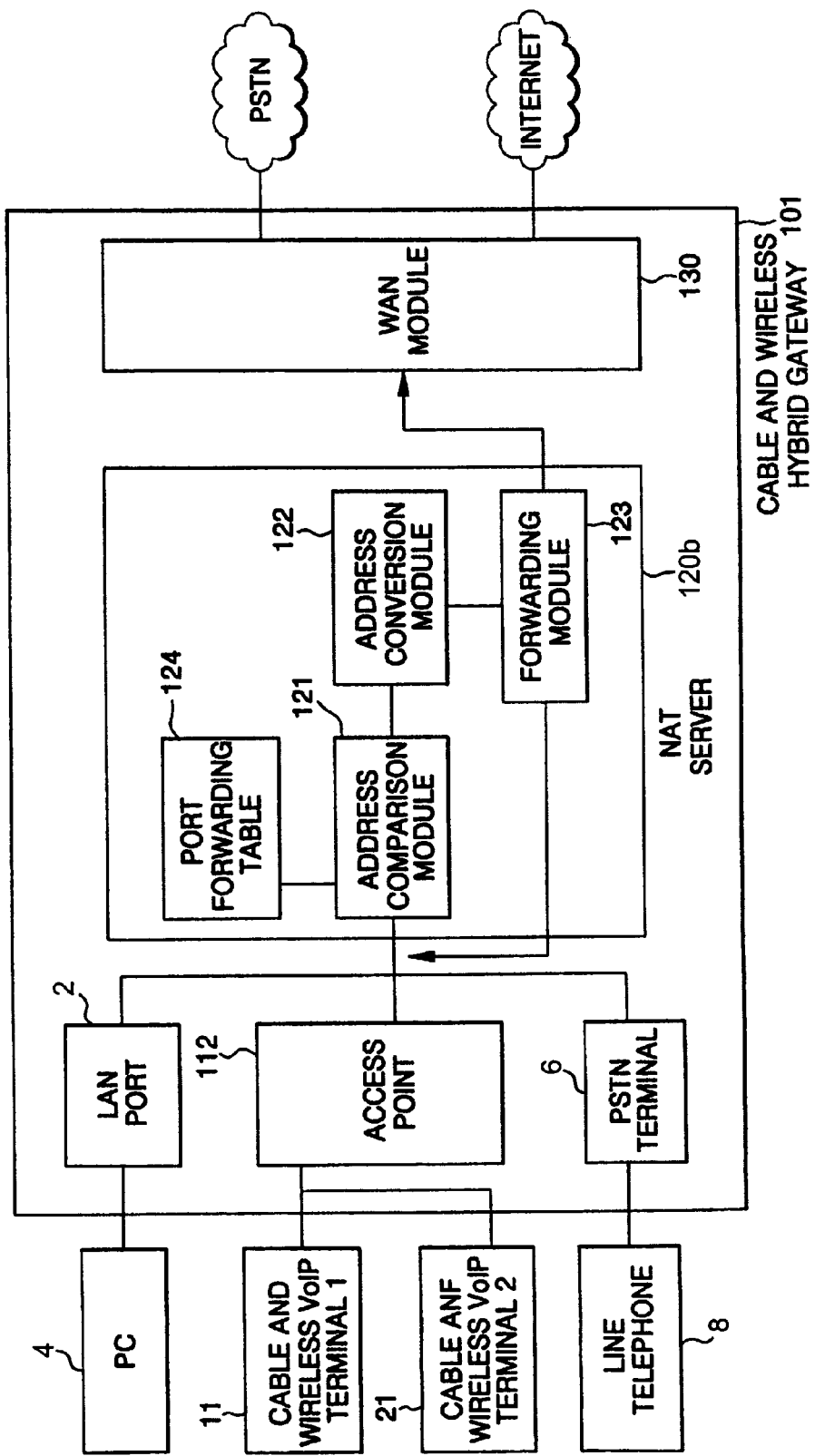
FIG. 4 is a diagram illustrating a cable and wireless hybrid gateway device according to a second embodiment of the present invention.

FIG. 4 illustrates a cable and wireless hybrid gateway controller for optimally controlling data transfer routes according to a second embodiment of the present invention.

The VoIP system includes a cable and wireless hybrid gateway 101 connected to cable and wireless VoIP terminals 11 and 21, an access point 112, the NAT server 120b, the WAN module 130, a LAN port 2 connected to a personal computer 4 and a PSTN terminal 6 connected to a telephone line 8, wherein the WAN module 130 is connected to the Internet and a public switched telephone network (PSTN). As an example of the cable and wireless hybrid gateway 101, there is 'OfficeServ SOHO' available from SAMSUNG Electronics Co., Ltd.

The cable and wireless VoIP terminals 11 and 21 are devices that users use to make a voice call like the internal terminals 10 and 20 of the first embodiment. The cable and wireless VoIP terminals 11 and 21 are connected with the access point 112 of the cable and wireless hybrid gateway 101 to transmit and receive an invite message for session connection, a response message for session connection, media data, and a control signal.

The access point 112 is a constitutional element for functioning to transmit and receive various signals from the cable and wireless VoIP terminals. The access point 112 is connected with the cable and wireless VoIP terminals 11 and 21 and the NAT server 120b to function to relay the invite message for session connection, the response message for session connection, and media data.

The NAT server 120b includes the address comparison module 121, the address conversion module 122, the forwarding module 123 and the port address table 124, like in the first embodiment. The elements will not be described again because they have the same function as the first embodiment.

An operation of the VoIP system including the NAT server of the first embodiment having such elements will be now described with respect to FIG. 3. Since the operation of the cable and wireless hybrid gateway according to the second embodiment is similar to that of the first embodiment, the description thereof will be omitted.

Table 1 shows a port forwarding table storing the internal IP addresses, the internal port numbers and the private conversion ports of the internal terminals. The port shown in Table 1 means a port for transmitting and receiving data. Herein, let's assume that the admitted IP address of the NAT server 120b is 211.214.161.107. Referring to the port forwarding table shown in Table 1, a procedure for setting a session between the internal terminals (1 and 2) 10 and 20 for call will be hereafter seen. Herein, to explain an operation thereof more easily, the internal terminals (1 and 2) 10 and 20 are defined as an originator's terminal and a recipient's terminal, respectively. The present invention will be described with respect to the operations of the address comparison module 121, the address conversion module 122 and the forwarding module 123 that are the characteristic features of the present invention.

TABLE 1

Port forwarding table storing information of the internal terminals

| Internal terminals | Internal IP | Internal port | Private conversion port |
|---|---|---|---|
| 1(originator's terminal) | 192.168.111.240 | 8004/UDP | 23000/UDP |
| 2(recipient's terminal) | 192.168.111.241 | 8004/UDP | 23002/UDP |
| ... | ... | ... | ... |

The address comparison module 121 of the NAT server 120b that receives the invite message for session connection from the originator's terminal 10 compares that the admitted IP address (211.214.161.107) of the recipient's terminal and the admitted IP address (211.214.161.107) of the NAT server 120b included in the invite message for session connection are same.

At this time, the port comparison module (not shown) included in the address comparison module 121 perceives an extension call by retrieving the internal terminal (2) 20 having the same port as the private conversion port (23002/UDP) of the recipient's terminal included in the invite message for session connection.

The address conversion module 122 converts the addresses and port information of the originator's and recipient's terminals included in the invite message for session connection into the internal IP addresses (192.168.111.240 and 192.168.111.241, respectively) and the internal port information (8004/UDP).

The forwarding module 123 forwards the invite message for session connection to the LAN module 110 to directly transfer it to the recipient's terminal 20 because the address of the recipient's terminal included in the invite message is the internal IP address (192.168.111.241).

According to the user's response, the recipient's terminal 20 generates a response message for session connection including the internal IP addresses (192.168.111.240 and 192.168.111.241) as the addresses of the originator's and recipient's terminals 10 and 20 to thus transfer it to the LAN module 110.

The LAN module 110 checks that the address of the originator's terminal 10 included in the response message for session connection is the internal IP address (192.168.111.240) and then transmits the response message for session connection.

Figure 5:
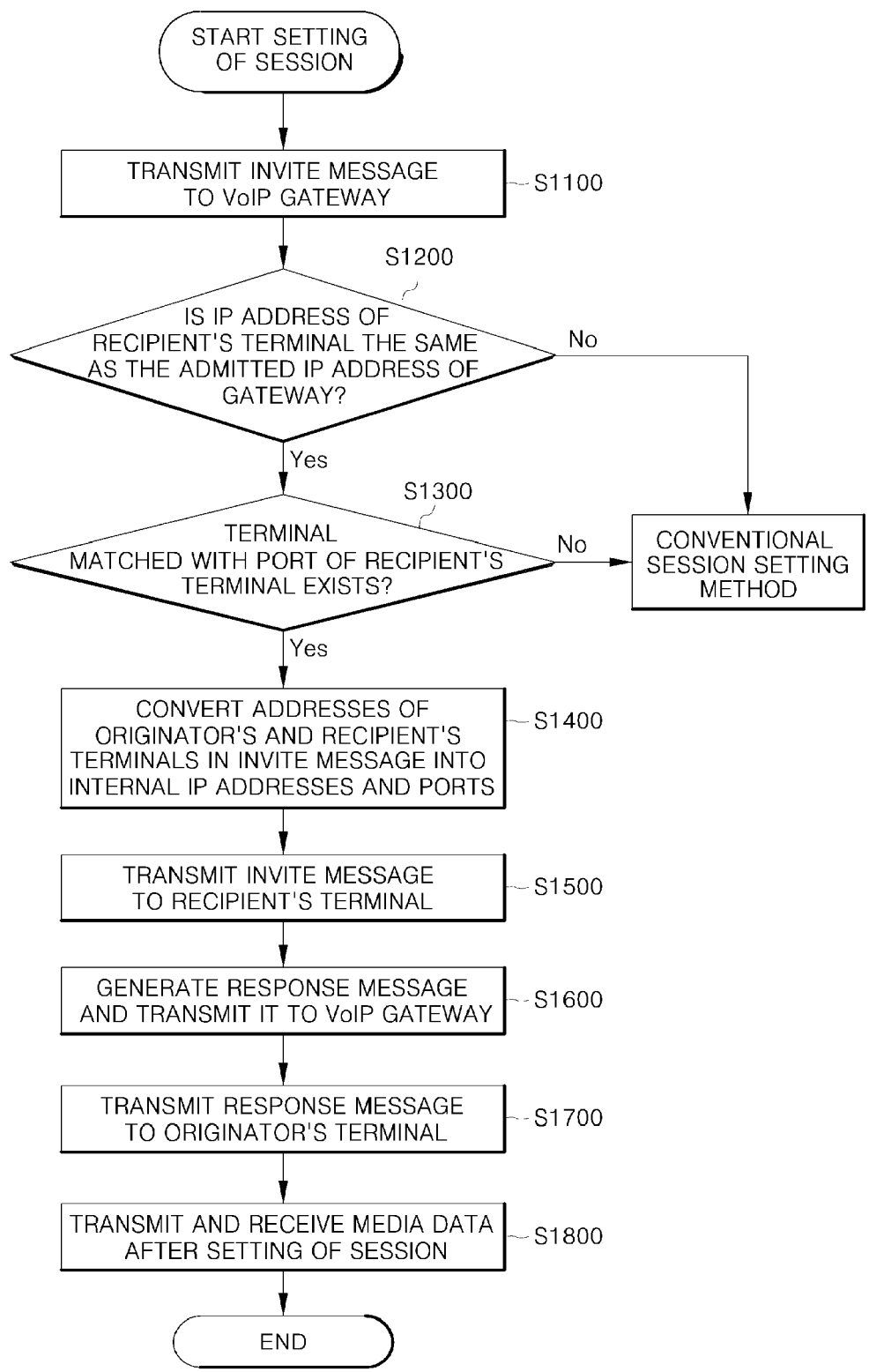
FIG. 5 is a flow chart illustrating a procedure of setting a session for VoIP extension call according to the present invention.

FIG. 5 is a flow chart illustrating a procedure for setting a session for VoIP extension call according to the present invention.

As illustrated in FIG. 5, when the user tries to conduct an extension call, the VoIP terminal generates an invite message for session connection to transmit it to the VoIP gateway (S1100).

The VoIP gateway that receives the invite message for session connection determines whether or not an IP address of the recipient's terminal included in the invite message for session connection is same as an admitted IP address of the VoIP gateway (S1200). If the two addresses are same, the VoIP gateway perceives that the recipient's terminal is connected with a body of the VoIP gateway or the VoIP gateway. Meanwhile, if the admitted IP address of the recipient's terminal and the IP address of the VoIP gateway are not same, the call is deemed to be a main wire call so that the invite message for session connection is transmitted to the other party's terminal via an Internet by means of a conventional session setting method (S1250).

If the IP address of the recipient's terminal and the admitted IP address of the VoIP gateway are same, the VoIP gateway retrieves a port forwarding table to check whether there is an internal terminal having the same port number as that of the recipient's terminal included in the invite message for session connection (S1300). If no internal terminal having the same port exists, the call is deemed to be a main wire call so that the invite message for session connection is transmitted to the other party's terminal via an Internet by means of a conventional session setting method (S1250).

If the internal terminal having the same port exists in course of such retrieving, it is considered that an extension call is established in the VoIP gateway and the VoIP gateway converts the admitted IP addresses and the private conversion port information of the originator's and recipient's terminals included in the invite message for session connection into the internal IP addresses and internal port information of the respective terminals (S1400).

The VoIP gateway transmits the invite message for session connection to the corresponding VoIP terminal using the internal IP addresses and port information of the recipient's terminal converted in the above process (S1500).

The recipient's VoIP terminal that receives the invite message for session connection informs the user of a fact of receiving the invite message for session connection, and if the user responds to this, generates a response message for session connection to transmit it to the VoIP gateway (S1600).

The VoIP gateway perceives the response message to be a message for extension call using the internal IP address of the originator's terminal included in the response message for session connection and transmits the response message for session connection to the originator's terminal (S1700).

Through the procedure, the setting of a session between the originator's and the recipient's terminals is completed. After setting of the session through the procedure, the two terminals transmit and receive media data including voice calling signal using the internal IP addresses and port information thereof (S1800).

Figure 6:
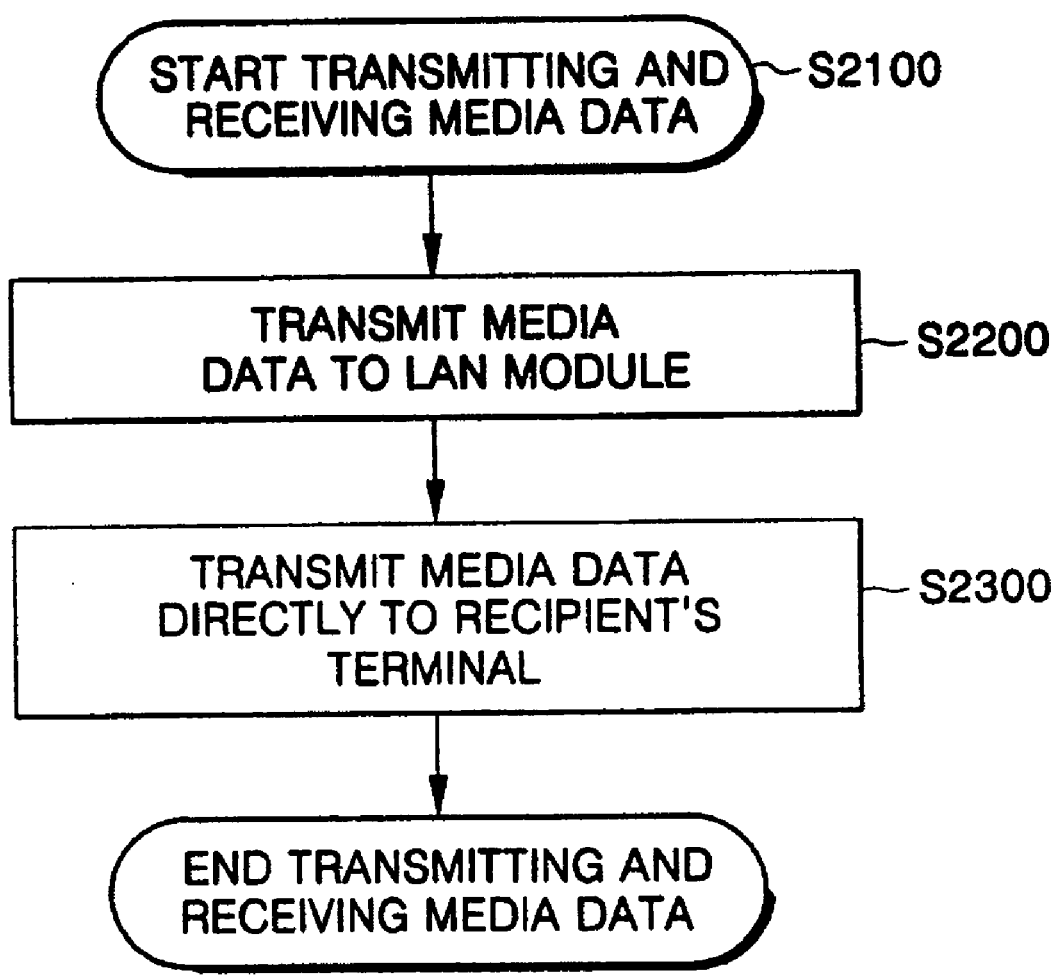
FIG. 6 is a flow chart illustrating a procedure of media data transfer according to the present invention.

FIG. 6 is a flow chart illustrating a procedure of transmitting and receiving media data according to the present invention.

After the procedure for setting of the session between the VoIP terminals included in a single network has been completed, the VoIP terminals begin to transmit and receive media data (S2100). The originator's terminal transmits media data including user's voice calling signal and a destination address to the LAN module such as an access point or a bridge (S2200).

In this case, the destination address and port included in media data is an internal IP address and an internal port of the recipient's terminal, so that they are directly transmitted to the recipient's terminal (S2300).

Of course, media data from the recipient's terminal may be also transmitted to the originator's terminal in the same manner.

Figure 7:
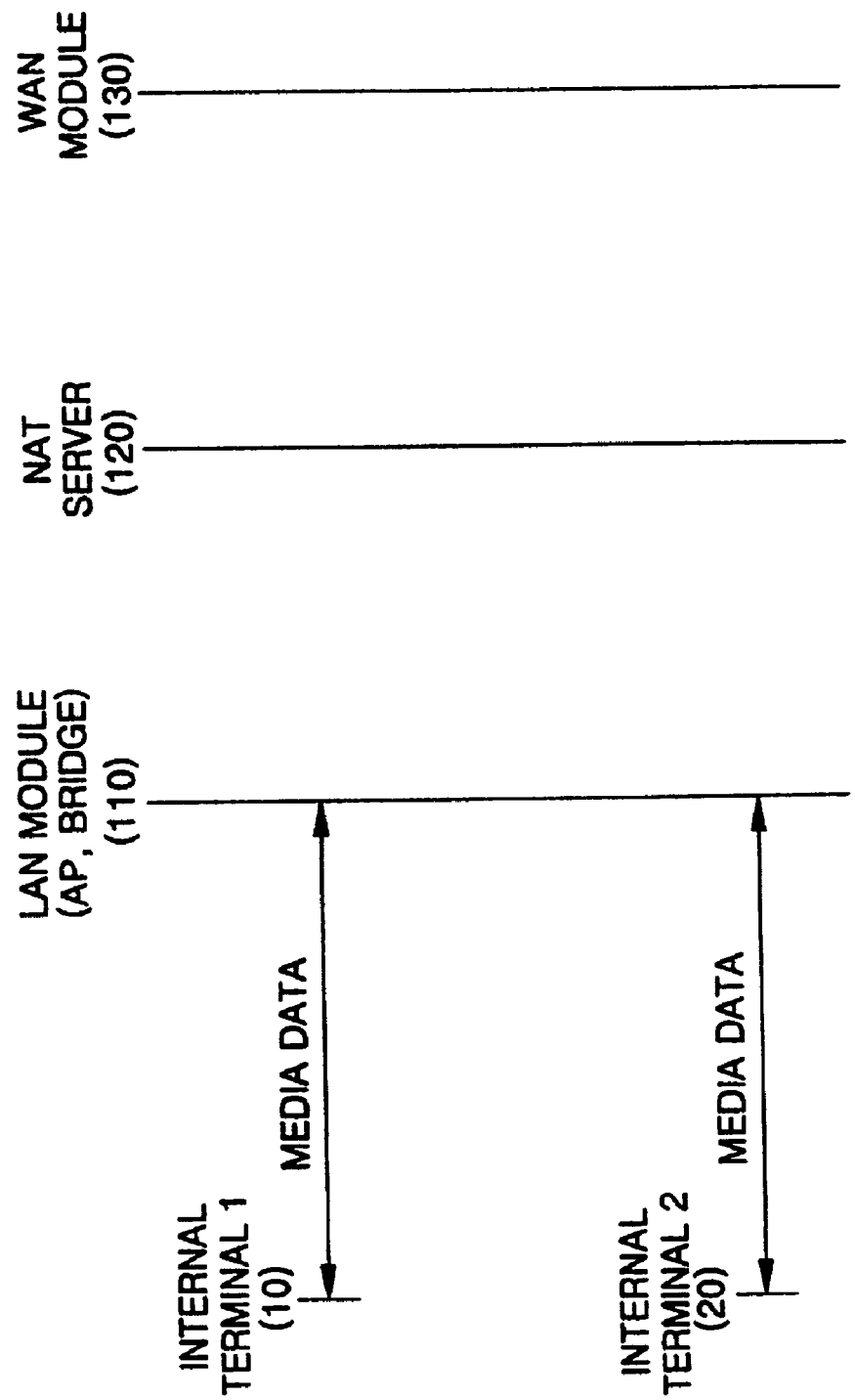
FIG. 7 is a diagram illustrating media data transfer routes according to the present invention.

FIG. 7 is a diagram illustrating transfer routes of media data according to the present invention. That is, FIG. 7 illustrates the transfer routes of media data in using the transfer method of media data as described in FIG. 6.

As illustrated on FIG. 7, media data is firstly transmitted to the LAN module such as an access point or a bridge. Media data transmitted to the LAN module are transmitted to the other party's terminal using an internal IP address and port information of the other party's terminal.

In case of using such transfer method, media data are transmitted by way of only the LAN module such as an access point or a bridge. The LAN module is a device corresponding to a link layer (layer 2) of open system interconnection (OSI) layer, so that media data are transmitted and received by way of up to the link layer. In case of using only up to the link layer in course of media data transfer, a procedure of Encapsulation/Decapsulation can be reduced, so that resources of a network can be more secured.

Figure 8:
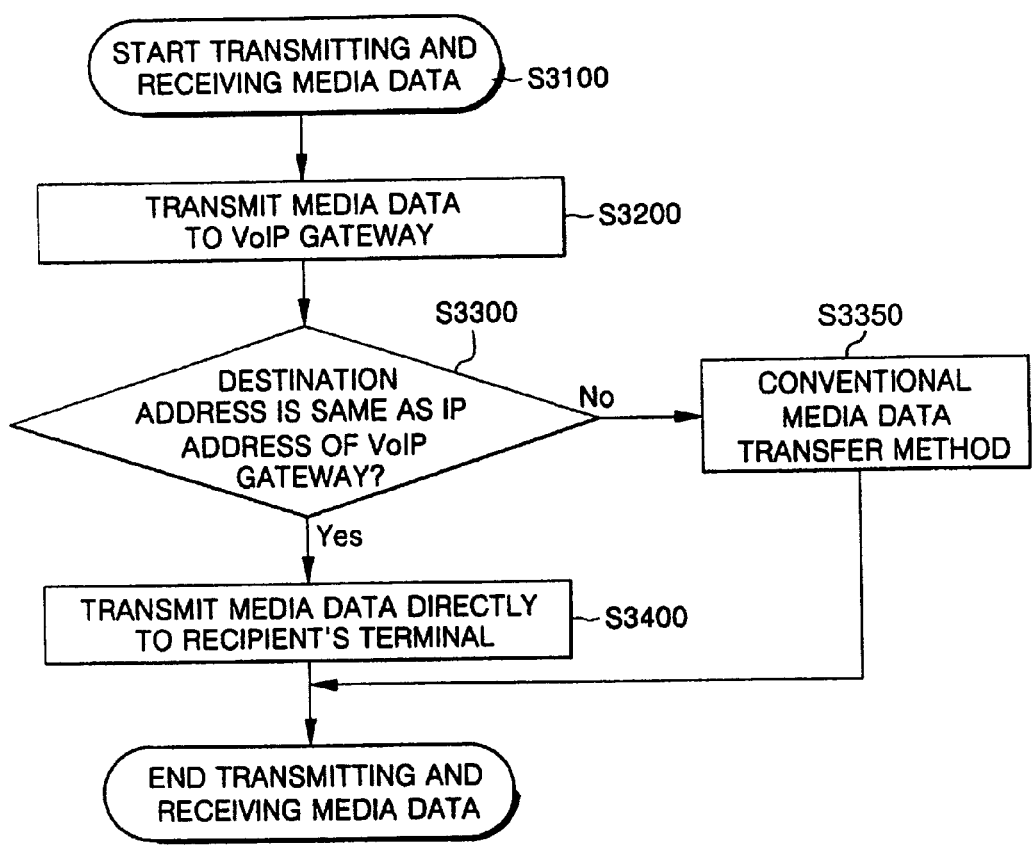
FIG. 8 is a flow chart illustrating a procedure of media data transfer via a VoIP gateway according to the present invention.

FIG. 8 illustrates a flow chart of a procedure for transmitting and receiving media data via the VoIP gateway according to the present invention.

The transfer method as described in FIG. 6 cannot be used when the NAT server operates as a basic router, or the two terminals use different sub-networks. FIG. 8 illustrates a transfer method of media data adaptable to even such cases.

For internal call, various VoIP terminals included in a single network set a session according to the previously described method, and begin to transmit and receive media data including a voice call (S3100).

The originator's terminal transmits media data including user's voice calling signal and a destination address to the VoIP gateway including the NAT server (S3200). In this case, the destination address included in media data is stored as the internal IP address of the recipient's terminal. This is because, in the course of setting a session, the two terminals each set a session using a message including an internal IP address and port information of the other party's terminal.

The VoIP gateway that receives media data checks a destination address included in the media data. The destination address included in media data is the internal IP address of the VoIP gateway so that the VoIP gateway perceives that media data are data for an extension call (S3300).

If the destination address included in media data is not the same as the internal IP address of the VoIP gateway, e.g., when media data for an external call are inputted, media data are transmitted to the other party's terminal via Internet according to a conventional transfer method of media data (S3350).

If destination address included in media data is the same as the internal IP address of the VoIP gateway, the VoIP gateway does not forward media data for internal call to an external network, but directly transmits it the recipient's terminal of the internal network (S3400).

Of course, media data transmitted from the recipient's terminal can be also directly transmitted to the originator's terminal in the same manner.

Figure 9:
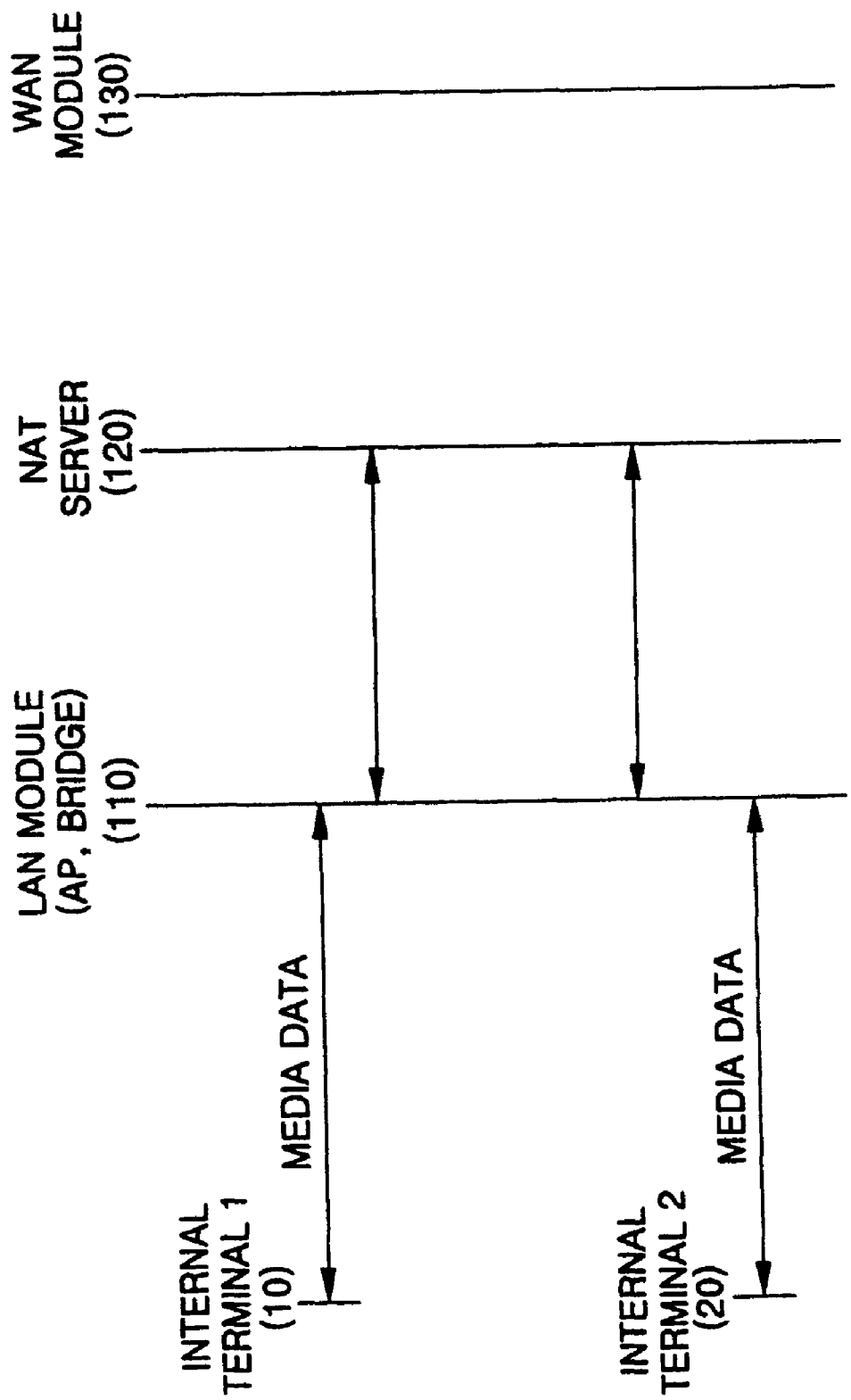
FIG. 9 is a diagram illustrating transfer routes of media data when transferred via a VoIP gateway.

FIG. 9 is a diagram illustrating transfer routes of media data when transmitted or received via VoIP gateway. That is, FIG. 9 illustrates the transfer routes of media data in using the transfer method of media data as described in FIG. 8.

As illustrated in FIG. 9, media data are transmitted firstly to the LAN module 110 of the VoIP gateway. The NAT server 120 receiving media data from the LAN module 110 checks an address of the originator's or recipient's terminal included in media data, and in turn forwards it to the LAN module 110. Consequently, media data are transmitted or received by way of only the LAN module 110 and the NAT server 120 of the VoIP gateway.

In using the transfer method of media data of FIG. 8, there is a drawback that media data are transferred further via the NAT server 120 in comparison with the transfer method of media data as described in FIG. 6. However, there is also an advantage that media data are transmitted and received without being transferred by way of the WAN module 130 in comparison with a conventional transfer method of media data.

As described before, according to the apparatus and method for data transfer in the VoIP gateway of the present invention, in case of an internal call, media data are transferred without being transferred by way of the NAT server and the proxy server, so that resources of network system can be effectively managed and there is an advantage that Encapsulation/Decapsulation is reduced.

While the invention has been described in conjunction with various embodiments, they are illustrative only. Accordingly, many alternative, modifications and variations will be apparent to persons skilled in the art in light of the foregoing detailed description. The foregoing description is intended to embrace all such alternatives and variations falling with the spirit and broad scope of the appended claims.

What is claimed is:

1. A method of data transfer for a voice over Internet protocol (VoIP) call, the method comprising:
    comparing an Internet protocol (IP) address of a recipient terminal in an invite message for session connection with an Internet protocol (IP) address of a VoIP gateway, the invite message being transmitted from a transmitter terminal to the VoIP gateway;
    upon determination that the Internet protocol (IP) address of the recipient terminal and the Internet protocol (IP) address of the VoIP gateway are the same, converting Internet protocol (IP) addresses and port information of the transmitter terminal and the recipient terminal included in the invite message to internal Internet protocol (IP) addresses and internal port information of the transmitter terminal and the recipient terminal to generate a converted invite message for session connection;
    transferring the converted invite message for session connection to the recipient terminal; and
    transferring a response message to the transmitter terminal to set a session, the response message comprising the internal Internet protocol (IP) address and the internal port information of the transmitter terminal.

2. The method according to claim 1, wherein comparing comprises determining whether an internal terminal comprises the same private conversion port as the port of the recipient terminal included in the invite message for session connection.

3. The method according to claim 1, wherein the VoIP gateway stores at least one of a private user datagram protocol (UDP) port number, an internal Internet protocol (IP) address, and an internal port or a private conversion port with respect to at least one internal terminal.

4. The method according to claim 1, further comprising, after setting the session, transmitting, by the transmitter terminal, media data to the internal Internet protocol (IP) address of the recipient terminal, or transmitting, by the recipient terminal, media data to the internal Internet protocol (IP) address of the transmitter terminal.

5. The method according to claim 4, wherein upon determination that the VoIP gateway operates as a basic router or the transmitter terminal and the recipient terminal use different sub-networks, determining whether a destination address in media data received in the VoIP gateway is the internal Internet protocol (IP) address to transfer the media data to the recipient terminal.

6. A voice over Internet protocol (VoIP) gateway configured to communicate with a recipient terminal and a transmitter terminal and to connect a public switched telephone network to an Internet protocol (IP) packet network, the VoIP gateway comprising:
- an address comparison module configured to compare an Internet protocol (IP) address of a recipient terminal included in a message with an Internet protocol (IP) address of the VoIP gateway, the message being transmitted from a transmitter terminal of an internal network of the VoIP gateway;
- an address conversion module configured to convert the Internet protocol (IP) addresses and port information of the transmitter terminal and the recipient terminal included in the message to internal Internet protocol (IP) addresses and internal port numbers of the transmitter terminal and the recipient terminal;
- a forwarding module configured to forward the message to a local area network (LAN) module upon determination that the Internet protocol (IP) address of the recipient terminal included in the message and the Internet protocol (IP) address of the VoIP gateway are the same; and
- at least one controller configured to control at least one of the address comparison module, the address conversion module, and the forwarding module.

7. The VoIP gateway according to claim 6, wherein the address comparison module comprises a port comparison module configured to determine whether an internal terminal comprises the same private conversion port as the port of the recipient terminal included in the message.

8. The VoIP gateway according to claim 6, wherein the message is one of an invite message for session connection and a response message for session connection.

9. The VoIP gateway according to claim 6, further comprising a port forwarding table configured to store at least one of a user datagram protocol (UDP) port number, an internal Internet protocol (IP) address, and an internal port or a private conversion port with respect to at least one internal terminal.

10. The VoIP gateway according to claim 6, wherein the VoIP gateway is configured to support at least one of a session initiation protocol (SIP), an H.323 protocol, and a Megaco protocol.

11. A network address translation (NAT) server configured to communicate with a recipient terminal and a transmitter terminal, the NAT server comprising:
- an address comparison module configured to compare an Internet protocol (IP) address of a recipient terminal included in a message with an Internet protocol (IP) address of the NAT server, the message being transmitted from a transmitter terminal of an internal network of the NAT server;
- an address conversion module configured to convert the addresses and port information of the transmitter terminal and the recipient terminal included in the message to internal Internet protocol (IP) addresses and internal port numbers of the transmitter terminal and the recipient terminal;
- a forwarding module configured to forward the message to a local area network (LAN) module upon determination that the Internet protocol (IP) address of the recipient terminal included in the message is the same as the Internet protocol (IP) address of the NAT server; and
- at least one controller configured to control at least one of the address comparison module, the address conversion module, and the forwarding module.

12. The NAT server according to claim 11, wherein the address comparison module comprises a port comparison module configured to determine whether an internal terminal comprises the same private conversion port as the port of the recipient terminal included in the message.

13. The NAT server according to claim 11, wherein the message is one of an invite message for session connection and a response message for session connection.

14. The NAT server according to claim 11, further comprising a port forwarding table configured to store at least one of a user datagram protocol (UDP) port number, an internal Internet protocol (IP) address, and an internal port or a private conversion port with respect to at least one internal terminal.

15. The NAT server according to claim 11, wherein the NAT server is configured to support at least one of a session initiation protocol (SIP), an H.323 protocol, and a Megaco protocol.

* * * * *